No. 750,361. PATENTED JAN. 26, 1904.
H. HARMET.
ELECTROMETALLURGY OF IRON OR STEEL.
APPLICATION FILED SEPT. 30, 1901.
NO MODEL. 2 SHEETS—SHEET 2.
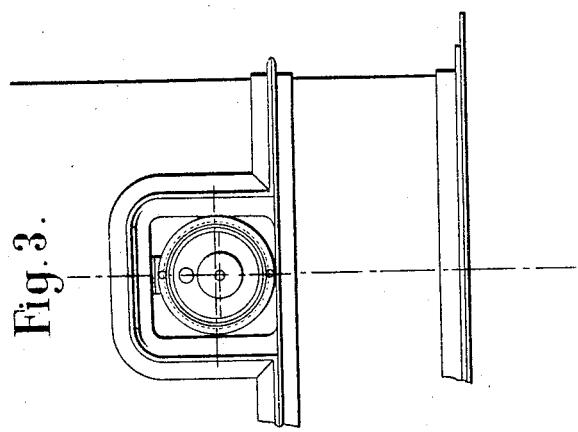
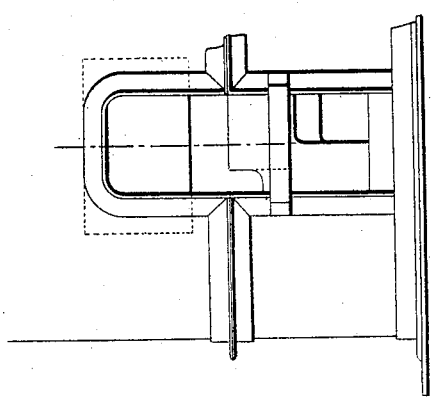
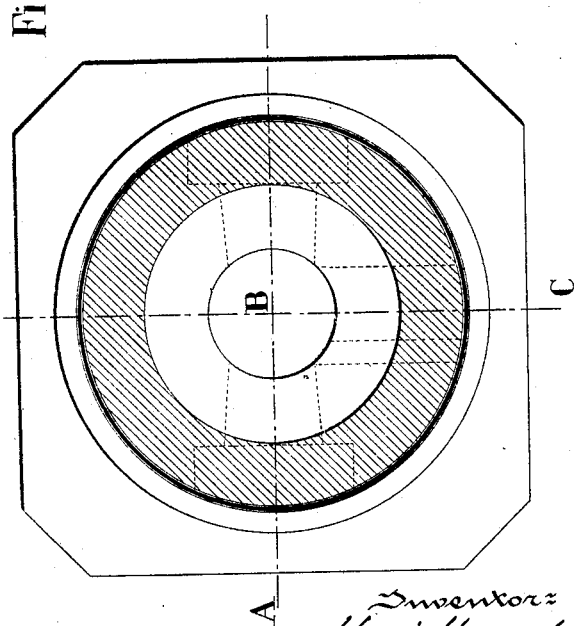

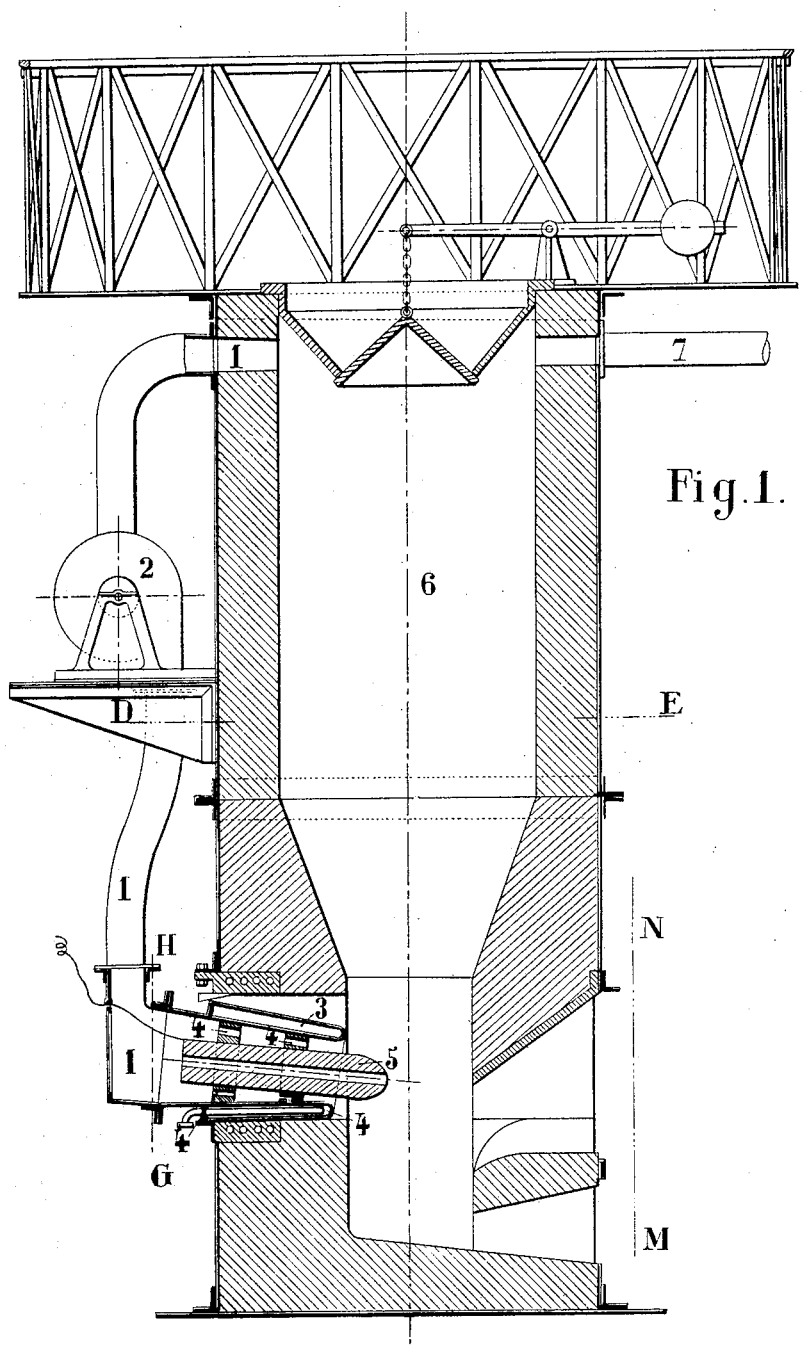

No. 750,361. Patented January 26, 1904.

UNITED STATES PATENT OFFICE.

HENRI HARMET, OF ST. ETIENNE, FRANCE.

ELECTROMETALLURGY OF IRON OR STEEL.

SPECIFICATION forming part of Letters Patent No. 750,361, dated January 26, 1904.

Application filed September 30, 1901. Serial No. 77,012. (No specimens.)

*To all whom it may concern:*

Be it known that I, HENRI HARMET, a citizen of the Republic of France, residing at St. Etienne, Loire, France, have invented certain new and useful Improvements in the Manufacture of Iron or Steel by Electrometallurgy, of which the following is a specification.

My invention has relation to a process or method whereby the charge of ores, fluxes, and carbon-reducing agent is first reduced and then fused, the heat of the fusion zone being furnished by an electric current and the reduction accelerated by heated gases taken from above the charge and forced through the fusion zone upward through the charge.

In the carrying out of my process, an apparatus for the continuous reduction and fusion of the charge is used, which is in the nature of an electric blast-furnace. The gases arising from above the charge are blown under pressure into the fusion zone or crucible of the furnace and are thereby heated and presented to the carbon-reducing agent in the charge to form carbon monoxid, which is a very active reducing agent. The furnace is at all times sealed against the entrance of external air.

The nature and scope of my invention will be more fully understood from the following description, taken in connection with the accompanying drawings, forming part hereof, in which—

Figure 1 is an elevational view, partly in section, of an apparatus for carrying out the method or process of my present invention, the section being taken on the lines A B C of Fig. 2. Fig. 2 is a horizontal sectional view on the line D E of Fig. 1. Fig. 3 is a section taken on the line G H of Fig. 1, and Fig. 4 is an elevation along the line M N of Fig. 1.

Referring to the drawings, there is illustrated a blast-furnace for the reduction and fusion of iron-ores. This furnace may be of required dimensions and may be as small as the ordinary cupola, provided it can conveniently carry on the operations continuously. The source of heat is furnished by an electric current, and in order to use this heat effectively for both the reduction and fusion of the mineral it is necessary to provide the furnace with an especial arrangement, whereby not only is the heat of the fusion zone diffused over a wide area and transmitted upward to the reduction zone, but there may also be formed in addition to the carbon-reducing agent a very active reducing agent in the form of carbon monoxid, which shall traverse the charge to be reduced. As may be readily understood, where fusion takes place by means of heat produced between electrodes separated by a resistance there is always at the fusion zone an excess of heat, which ordinarily is wasted, because it passes downward with the molten metal. To make this heat rise in the furnace and to increase the area of the fusion zone, an arrangement (shown in the drawings) has been devised whereby gas is taken from the mouth of the furnace above the charge to be reduced and blown into the fusion zone or crucible adjacent to the electrodes, the furnace being at the same time sealed to prevent the entrance of external air and kept under required pressure. The minerals to be reduced with an excess of the reducing agent—usually coke—are charged into the mouth of the furnace above the fusion zone. A portion of the gas arising above the charge is sucked out of the mouth of the furnace through the pipe 1 by a fan or blowing apparatus 2 and forced through water-cased twyers 3 into the fusion zone, where the poles or electrodes 5 are located. The casing of the twyers 3 incloses insulating-supports 4 of porcelain, through which the electrodes 5 project into the interior of the furnace at or near its base. The supports 4 and the electrodes 5 are preferably pierced to permit of the entrance of the gases from the twyers 3 into the fusion zone. The portion of the gas not exhausted from the mouth of the furnace passes out by the pipe 7 to any point where it may be utilized or discharged. The gas entering the fusion zone under pressure is forced upward through the charge carrying the excess heat into said charge. The gas escaping from the mouth when brought into contact with the incandescent coke adjacent to the fusion zone is converted into carbonic monoxid (CO) with a little carbonic acid ($CO_2$) and contains no trace of nitrogen. It thus serves as a very efficient reducing agent in addition to diffusing the local heat of the electrodes and transmitting to the charge the excess heat of the fusion zone. After traversing the charge the gas collects again in the mouth of the furnace and is again withdrawn by the blowing apparatus for reuse in the fusion and reduction zones.

In the present process the reduction of the charge precedes the fusion, and each operation proceeds at different points or zones in the furnace. The furnace may therefore be worked continuously and sequentially, which is impossible in furnaces where the reduction and fusion take place at the same point or zone. In this latter instance the fusion precedes the complete reduction, and the flow of slag containing unreduced oxids of the ore cannot take place without interrupting the working or charging of the furnace to give time for the completion of the reduction of the charge.

Having thus described the nature and object of my invention, what I claim as new, and desire to secure by Letters Patent, is—

1. The process of continuously and sequentially reducing and fusing iron ores by electrometallurgy, which consists in first charging the ore and an excess of reducing-carbon into the upper portion of an electric furnace, second, heating the base of the furnace from electrodes to form a fusion zone or crucible in the furnace, third, conveying gas taken from above the charge into the fusion zone adjacent to the electrodes, fourth, forcing said gas under pressure through the fusion zone to thereby diffuse the heat of the zone, extend its area and convert the gas into carbon monoxid, and finally forcing the carbon monoxid thus formed through the charge to create a reducing zone in the charge above the fusion zone of the furnace.

2. The improvement in the conversion of iron ore into iron or steel by electrometallurgy, which consists in first charging the ore and an excess of reducing materials into an electric blast-furnace, second, heating the base of the charge by electric heat conveyed through electrodes to thereby fuse the charge, third, collecting from above the charge the gas arising through the charge from the point of fusion, and fourth, forcing said gas under pressure into and through the fusion zone and charge successively to thereby diffuse and extend the area of the electric heat and create in the charge a reducing zone above the fusing zone of the furnace.

3. The improvement in the electrometallurgy of iron and similar ores, which consists in first charging the furnace with the materials to be reduced and fused in conjunction with an excess of reducing-carbon, second, heating the base of the charge with an electric current derived from opposing electrodes, third, forcing reducing-gas into the fusion zone adjacent to the electrodes to diffuse said zone and increase its area, and fourth, creating in the charge above the fusion zone a reducing zone by forcing the gases successively through the fusion zone and charge.

4. The improvement in the electrometallurgy of iron and similar ores, which consists in first charging an electric furnace with the materials to be reduced and fused in conjunction with an excess of reducing-carbon, second, maintaining the interior of the furnace under pressure and excluding the external air from said furnace, third, heating the base of the charge by electric heat derived from opposing electrodes, fourth, conveying gases arising from above the charge to the base of the charge adjacent to the electrodes, and fifth, forcing said gases under pressure upward through the charge to create a diffused fusion zone preceded by a reduction zone, whereby the reduction and fusion of the ore may proceed continuously and sequentially.

In testimony whereof I have signed this specification in the presence of two subscribing witnesses.

HENRI HARMET.

Witnesses:
HASTINGS BURROUGHS,
MAX ZETTER.